United States Patent
West

(10) Patent No.: US 6,663,091 B2
(45) Date of Patent: Dec. 16, 2003

(54) HYDRAULIC BEARING

(75) Inventor: John Philip West, Kirklington (GB)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 10/026,981

(22) Filed: Dec. 18, 2001

(65) Prior Publication Data
US 2002/0089104 A1 Jul. 11, 2002

(30) Foreign Application Priority Data
Dec. 21, 2000 (DE) .......................... 100 64 331

(51) Int. Cl.[7] ................................ F16F 13/00
(52) U.S. Cl. .................. 267/140.13; 267/122; 267/35
(58) Field of Search .................. 267/140.13, 140.12, 267/140.3, 141.2, 140.14, 219, 140.11, 140.15, 122, 35

(56) References Cited

U.S. PATENT DOCUMENTS

| | | | | |
|---|---|---|---|---|
| 4,869,476 A | * | 9/1989 | Shtarkman | 267/140.14 |
| 4,886,253 A | * | 12/1989 | Lun | 267/140.13 |
| 5,116,029 A | * | 5/1992 | Gennesseaux | 267/140.14 |
| 5,961,104 A | * | 10/1999 | Gennesseaux | 267/140.14 |
| 6,102,380 A | * | 8/2000 | Tsutsumida | 267/140.12 |
| 6,199,842 B1 | * | 3/2001 | Gennesseaux et al. | 267/140.13 |
| 6,341,766 B1 | * | 1/2002 | Stiller et al. | 267/140.13 |

FOREIGN PATENT DOCUMENTS

EP 0 547 287 B1 4/1995

* cited by examiner

Primary Examiner—Christopher P. Schwartz
Assistant Examiner—Melanie Torres
(74) Attorney, Agent, or Firm—Kenyon & Kenyon

(57) ABSTRACT

A hydraulic hearing, including a supporting bearing (1) and a bearing member (2), which are supported against each other by an elastic spring element (3) made of rubber elastic material, and delimit a working chamber (4) and the compensating chamber (5); the working chamber (4) and a compensating chamber (5) each being filled with damping fluid (6) and being in fluid communication with each other; the bearing member (2) essentially being formed in the shape of a pot; the supporting bearing (1) and the elastic spring element (3) essentially being disposed in the interior space (7) defined by the pot-shaped bearing member (2); the bearing member (2) having a two-shell design on its peripheral side, and an outer ring (8) which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (8) and inner ring (9) so as to be liquid-tight.

26 Claims, 12 Drawing Sheets

A-A

A-A

HYDRAULIC BEARING

BACKGROUND OF THE INVENTION

1. Field of the Invention

The present invention relates to a hydraulic bearing.

2. Description of Related Art

Hydraulic bearings are well-known, for example, from European Patent No. 0 547 287 B1. The previously known hydraulic bearing, as disclosed in European Patent No. 0 547 287 B1, includes a pot-shaped housing, in which the opening is sealed by an annular spring element made of an elastomeric material, a separating wall having a flow-through opening being positioned in the axial direction between the spring element and the housing base. On the one side, the separating wall, together with the spring element, delimits a working chamber in the axial direction, and on the other side, the separating wall, together with a boundary wall, delimits a compensating chamber in the axial direction. The working and the compensating chambers are each filled with damping fluid, and communicate through the flow-through opening in the separating wall. In the axial direction, the separating wall between the working and compensating chambers is constructed in two parts and perforated in a grid-like manner. An annular diaphragm, which can vibrate in the axial direction, is axially positioned between the parts of the separating wall, near the grid-like structure. Because the working chamber and the compensating chamber are connected in series in the axial direction, the design of the previously known hydraulic bearing is relatively large in the axial direction. In addition, the separating wall has a relatively complicated design between the working and compensating chamber, which is unsatisfactory in regard to technical function and economics.

SUMMARY OF THE INVENTION

It is an object of the invention to provide a hydraulic bearing of the type described above which has more compact dimensions in the axial direction. It is another object of the invention to provide such a hydraulic bearing having a small number of parts so that the bearing is simple and inexpensive to manufacture.

These and other objects of the invention are achieved by a hydraulic bearing, including a supporting bearing (1) and a bearing member (2), which are supported against each other by an elastic spring element (3) made of rubber elastic material, and delimit a working chamber (4) and a compensating chamber (5); the working chamber (4) and the compensating chamber (5) each being filled with damping fluid (6) and being in fluid communication with each other; the bearing member (2) essentially having a pot-shaped design; the supporting bearing (1) and the elastic spring element (3) essentially being disposed in the interior space (7) defined by the pot-shaped bearing member (2); the peripheral side of bearing member (2) is having a two-shell design and an outer ring (8), which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (6) and inner ring (9) in a liquid-tight manner.

BRIEF DESCRIPTION OF THE DRAWINGS

The present invention will be described in greater detail with reference to the following drawings wherein.

DETAILED DESCRIPTION OF THE INVENTION

Figure 1:
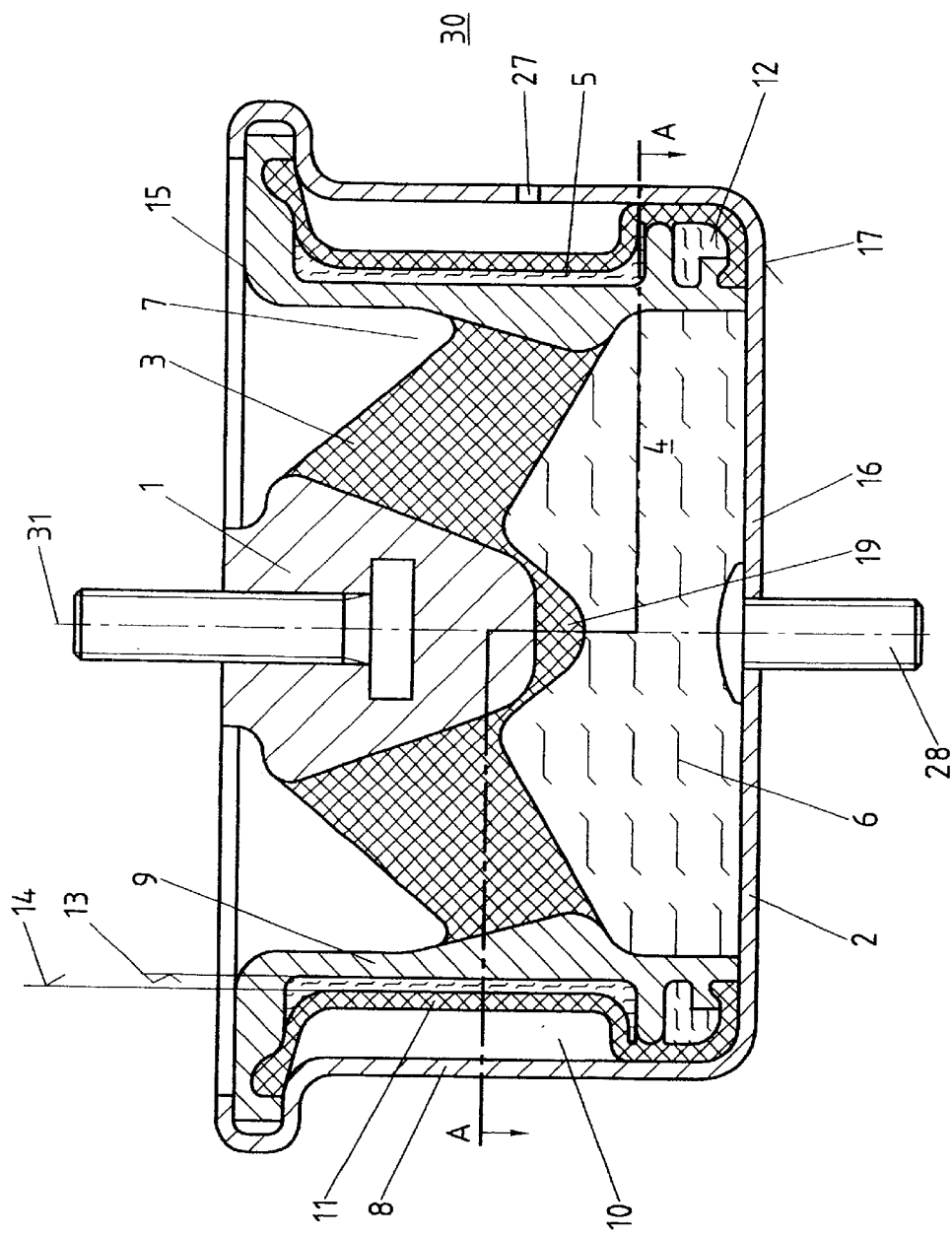
FIG. 1 shows a longitudinal section of a first exemplary embodiment.

The hydraulic bearing includes a supporting bearing and a bearing member, the latter two being supported against each other by an elastic spring element made of rubber elastic material, and defining a working and compensating chamber, each of which are filled with damping fluid and are in fluid communication with one another; the bearing member essentially having a pot-shaped design, the supporting bearing and the elastic spring element essentially being disposed in the interior space defined by the pot-shaped bearing member; the peripheral side of the bearing member having a two-shell design and an outer ring that encloses an inner ring with a radial clearance; the compensating chamber being disposed in the gap formed by the clearance, and being defined by a boundary wall that extends in the axial direction, can bulge out in the radial direction, and essentially accommodates an increase in volume in a pressureless manner; and the boundary wall being positioned between the outer and inner rings in a fluid-tight manner. Because the compensating chamber at least partially encloses the peripheral side of the working chamber, the hydraulic bearing has a very compact construction in the direction of the introduced vibration. The configuration of the working chamber and the compensating chamber with respect to each other obviates the need for a dividing wall according to the related art, so that the hydraulic bearing can be manufactured cost-effectively due to its simple construction and small number of parts.

As is customary with hydraulic bearings, the elastic spring element can essentially have a frustoconical design. In this case, it is advantageous that the elastic spring element is mostly in precompression during normal use, so that tensile stresses reducing service life are eliminated to a large extent.

The boundary wall can be formed in the shape of a rolling diaphragm. The advantage of the rolling-diaphragm design is that liquid components displaced from the working chamber into the compensating chamber only lead to a negligible increase in pressure in the working chamber. The excellent flexibility of the rolling-diaphragm-shaped boundary wall essentially enables the volume of liquid to be received inside the compensating chamber in a pressureless manner. Because of the rolling-diaphragm design, the mechanical stresses are very small, and the hydraulic bearing exhibits good working properties over a long service life.

The elastic spring element can be vulcanized between the supporting bearing and the inner ring. This produces a very durable bond.

The inner ring and the boundary wall can form the boundary of a damping channel, which puts the working and compensating chambers in fluid communication with each other. In this case, the damping channel is designed so as to damp low-frequency, high-amplitude vibrations introduced into the hydraulic bearing, by displacing liquid components to and fro inside the damping channel, which move in phase opposition to the introduced vibrations.

The compensating chamber can be delimited by the outer surface of the inner ring and the inner surface of the boundary wall. The liquid components expelled from the working chamber via the damping channel reach the compensating chamber, and because of the flexible design of the boundary wall, they are essentially received without an increase in pressure. The outer ring is provided with at least one opening, through which the side of the boundary wall opposite to the compensating chamber is subjected to ambient pressure.

The outer ring is preferably formed by a deep-drawable piece of sheet metal, which surrounds and form-locks the end face of the inner ring facing the supporting bearing. Deep-drawable sheet-metal pieces can be manufactured easily and inexpensively and, for example, can be fastened to adjacent parts by beading or flanging.

The outer ring can have a base that forms the hydraulic-bearing end face on the side of the bearing member. In this manner, the base forms the working-chamber boundary edge facing away from the supporting bearing, the working chamber preferably being sealed by, e.g. toroidal component parts of the boundary wall, and thereby being protected against losing hydraulic fluid.

The base can have at least one first stop buffer protruding in the direction of the supporting bearing. The use of stop buffers extending axially in the direction of the introduced vibrations has the advantage of preventing extreme excursion movements of the supporting bearing with respect to the bearing member. The limited stroke reduces the mechanical stresses on the elastic spring element. The elastic spring element exhibits continuously good working properties over a long service life. For example, the stop buffer can have an annular design and be disposed in the center of the base. Apart from that, however, there is also the possibility of providing a plurality of stop buffers adjacent to each other.

The first stop buffer can be made of an elastomeric material. In view of the object to be achieved, it is especially advantageous when the first stop buffer and the boundary wall are formed from a uniform material and configured integrally and continuously in one another. The boundary wall is then deflected near the base and, e.g. completely covers it. For example, the first stop buffer can be formed by the head of a fixing screw, which is covered by the elastomeric material of the boundary wall. Additionally and/or alternatively, there is also the possibility of forming the supporting bearing from a core, which has a projection arranged in the direction of the base. In this case, the projection is preferably covered by the elastomeric material of the elastic spring element. The first stop buffer is already formed at the same time, during the vulcanization of the elastic spring element. Then, the supporting bearing has at least one second stop buffer protruding axially in the direction of the working chamber.

The first and the second stop buffers can contact each other in the axial direction, in order to limit extreme excursion movements. Different refinements, in which the first stop buffer can be disposed at the supporting bearing and the second stop buffer at the base, are conceivable as well. Because extreme excursion movements of the elastic spring element are prevented, the durability of the elastic spring element is increased.

A diaphragm capable of vibrating in the axial direction can be positioned inside the working chamber. This diaphragm is provided for insulating against high-frequency, low amplitude vibrations. The insulation against high-frequency, low-amplitude vibrations occurs in such a manner, that the damping channel is hydraulically blocked in response to introducing such vibrations, and the diaphragm vibrates in phase to the initiated, high-frequency vibrations. Such vibrations excited, e.g. by the tread pattern of rolling vehicle tires and/or by the road-surface covering, are effectively insulated against in this manner.

A simple refinement can provide for the diaphragm and the boundary wall being formed from a uniform material and configured integrally and continuously in one another, and for at least an annular subsection of the diaphragm being positioned adjacently to the base with an axial clearance. The diaphragm and the boundary wall are made of a uniform elastomeric material, the integral part including the diaphragm and boundary wall preferably being held between the inner ring and the outer ring by friction-locking or form-locking.

In order to ensure that the annular subsection of the diaphragm can vibrate in every operating state, and does not permanently rest against the base, the outer- and inner-surface sides of the annular subsection can each be provided with at least one spacer supporting them at the base. In this manner, the base forms a stop for the annular subsection in the direction of the bearing member.

In order to also provide a stop on the side of the annular subsection facing the working chamber, the subsection on the side facing the working chamber can be covered by a latticed stop positioned adjacently to it with an axial clearance. In this case, the latticed stop can be designed as a separately manufactured insert and, for example, be clamped in the axial direction between the inner ring and the diaphragm. The insert is made of a tough material, e.g. a metallic material. In this connection, it is advantageous that the insert is permanently resistant to the damping fluid. In contrast, there is also the option of manufacturing the insert from a suitable polymeric material.

It is preferable to centrally position the annular, vibratory subsection of the diaphragm in an axial direction between the base and the stop, so that the axial clearances between the subsection and the base, and between the subsection and the stop, are essentially identical.

Another refinement offers the possibility of positioning a radially vibratory diaphragm inside the working chamber. The advantage of such a refinement is that the boundary wall and the diaphragm can indeed be configured integrally and continuously in one another, and formed from a uniform material, but that the base of the bearing member does not need to be covered by the diaphragm as much as in the previously described refinement, where the annular subsection extended in a direction parallel to the base. Apart from a reduction in material costs of the elastomeric material, such a refinement has the advantage that the latticed stop facing the working chamber can form a one-piece component of the inner ring, so that there is no need for a separate insert. The inner and outer sides of the diaphragm are then positioned so as to be radially adjacent to the latticed stop and the outer ring, with axial clearance, while in the region of the diaphragm, the outer ring has at least one through-bore open in the direction of the surroundings, just as in the previous exemplary embodiment. The diaphragm extends in the axial direction, a latticed stop that covers the diaphragm being provided on the side radially facing the working chamber.

Because the stop can form a one-piece, integral component of the inner ring, the hydraulic bearing is designed with a small number of parts overall, which is an advantage deserving special mention from an economic and manufacturing standpoint.

As viewed in longitudinal cross-section, the compensating chamber, in at least one subsection of its extension on the peripheral side, can have a cross-section which becomes smaller in the direction of the bearing-member base.

Buffer stops for axial and radial deflection movements are formed by this form of the hydraulic bearing. In addition, an advantageous effect in the high frequency range is achieved by the inner surface of the first buffer stop 29. In this frequency range, the result is a to-and-fro displacement of the liquid components into and out of this area.

A rebound-travel stop can be assigned to the supporting bearing on the side of it axially facing away from the bearing member. The rebound-travel stop limits the rebounding movements of the supporting bearing with respect to the bearing member, and this prevents the elastic spring element from being subjected to tensile and/or sheer stresses reducing the service life. For example, the rebound-travel stop can essentially have an annular form, its outer surface being, e.g. clamped in the outer ring, it being supported on the inside at the inner ring, and it being positioned adjacently to the supporting bearing, with an axial clearance. In order to prevent impact noises in the case of extreme rebound movements, the inner surface of the rebound-travel stop and/or the side of the supporting bearing facing the rebound-travel stop can be provided with at least one buffer made of elastomeric material.

The rebound-travel stop and the supporting bearing can only be brought into contact by undesirably large rebounding movements of the hydraulic bearing.

Six exemplary embodiments of hydraulic bearings are shown in FIGS. 1 through 12, where respective working chambers 4 are radially encircled on the outside by at least one compensating chamber.

Such hydraulic bearings have an especially compact construction in the axial direction, since no compensating chamber 5 is contiguous to working chamber 4 in the axial direction. In addition, the hydraulic bearings have a simple and cost-effective design, since working chamber 4 and compensating chamber 5 are not separated from each other by a conventional dividing wall designed as a nozzle cage.

In all six exemplary embodiments shown in FIGS. 1 through 12, supporting bearing 1 and bearing member 2 are supported on each other by an essentially frustoconical, elastic spring element made of rubber elastic material. Working chamber 4 and compensating chamber 5 are each filled with damping fluid 6, which can be made of a water-glycol mixture in order to also retain flowability at low temperatures. Working chamber 4 and compensating chamber 5 are connected by damping channel 12, which encloses the peripheral side of working chamber 4 to a large extent. The relatively large volume of damping fluid 6 received inside damping channel 12 allows low-frequency, high-amplitude vibrations, such as those occurring while driving over curbs, to be damped effectively. The damping effect is derived from the to-and-fro movement of damping fluid 6 disposed in damping channel 12, the movement being not necessarily 180 degrees out of phase in comparison with the introduced vibrations.

In each of the exemplary embodiments shown here, bearing member 2 has a two-shell design and includes an outer ring 8, which encircles an inner ring 9 with a radial clearance, compensating chamber 5 being disposed inside gap 10 formed by the clearance. Compensating chamber 5 essentially extends in the axial direction and is delimited by a boundary wall 11, which can expand in the radial direction and can essentially accommodate a volume increase pressurelessly.

Outer ring 8 has an end face 17 and at least one opening 27, so that the space between boundary wall 11 and outer ring 8 is subjected to atmospheric pressure. Boundary wall 11, which also seals damping channel 12 from surroundings 30 in each of the exemplary embodiments shown, is clamped between outer ring 8 and inner ring 9 in a liquid-tight manner.

To be able to essentially receive the liquid components displaced from working chamber 4 in compensating chamber 5 without an increase in pressure, boundary wall 11 is formed in the shape of a rolling diaphragm.

In each of the exemplary embodiments shown here, outer ring 8 essentially has a pot-shaped design, and is made of a one-piece, deep-drawn piece of sheet metal, which is crimped on the end face 15 of inner ring 9 facing supporting bearing 1.

Compensating chamber 5 is delimited by outer surface 13 of inner ring 9 and inner surface 14 of boundary wall 11.

In FIG. 1, the side of supporting bearing 1 facing working chamber 4 is provided with a second stop buffer 19, which can be brought into contact with mounting element 28 disposed in the base, in order to limit extreme spring-deflection movements.

Figure 2:
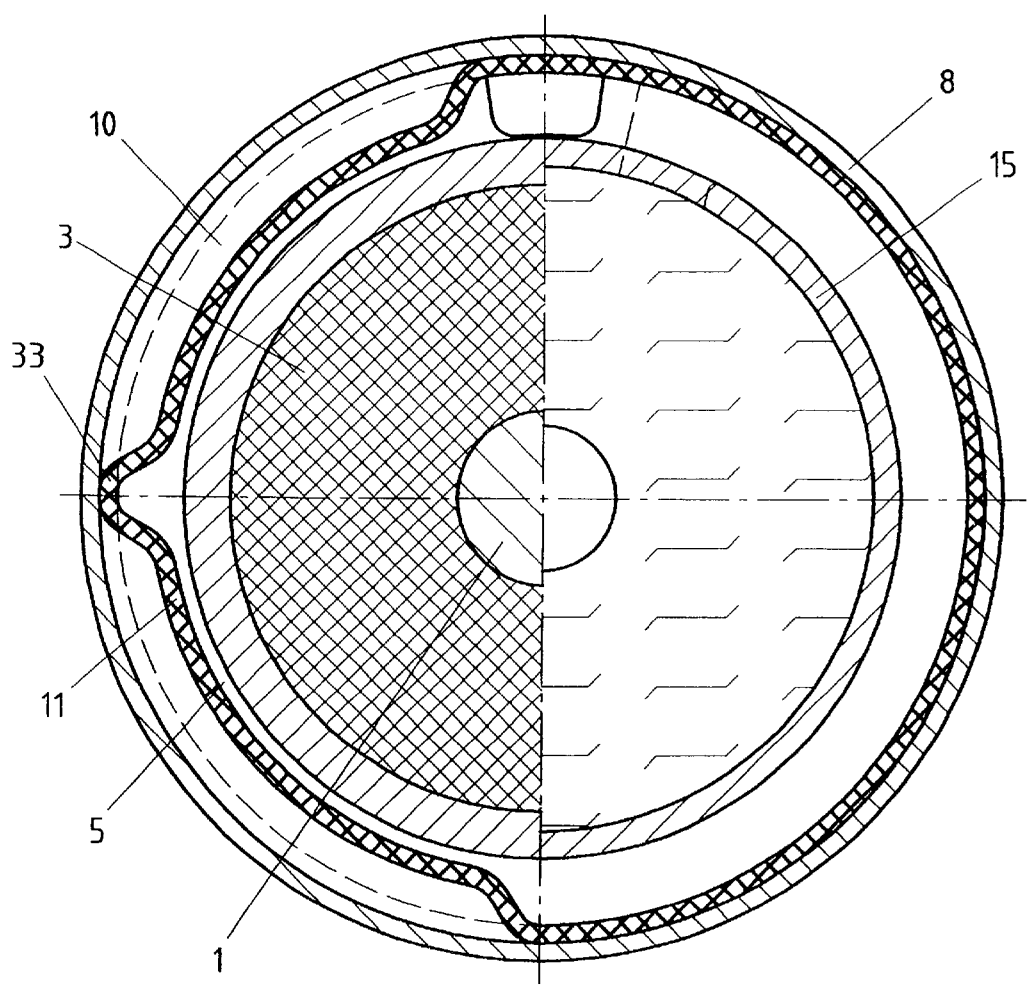
FIG. 2 shows a cross-section of the exemplary embodiment from FIG. 1.

FIG. 2 shows a cross-section of the bearing from FIG. 1. Here, one can recognize the course of damping channel 12, which connects working chamber 4 to compensating chamber 5.

Figure 3:
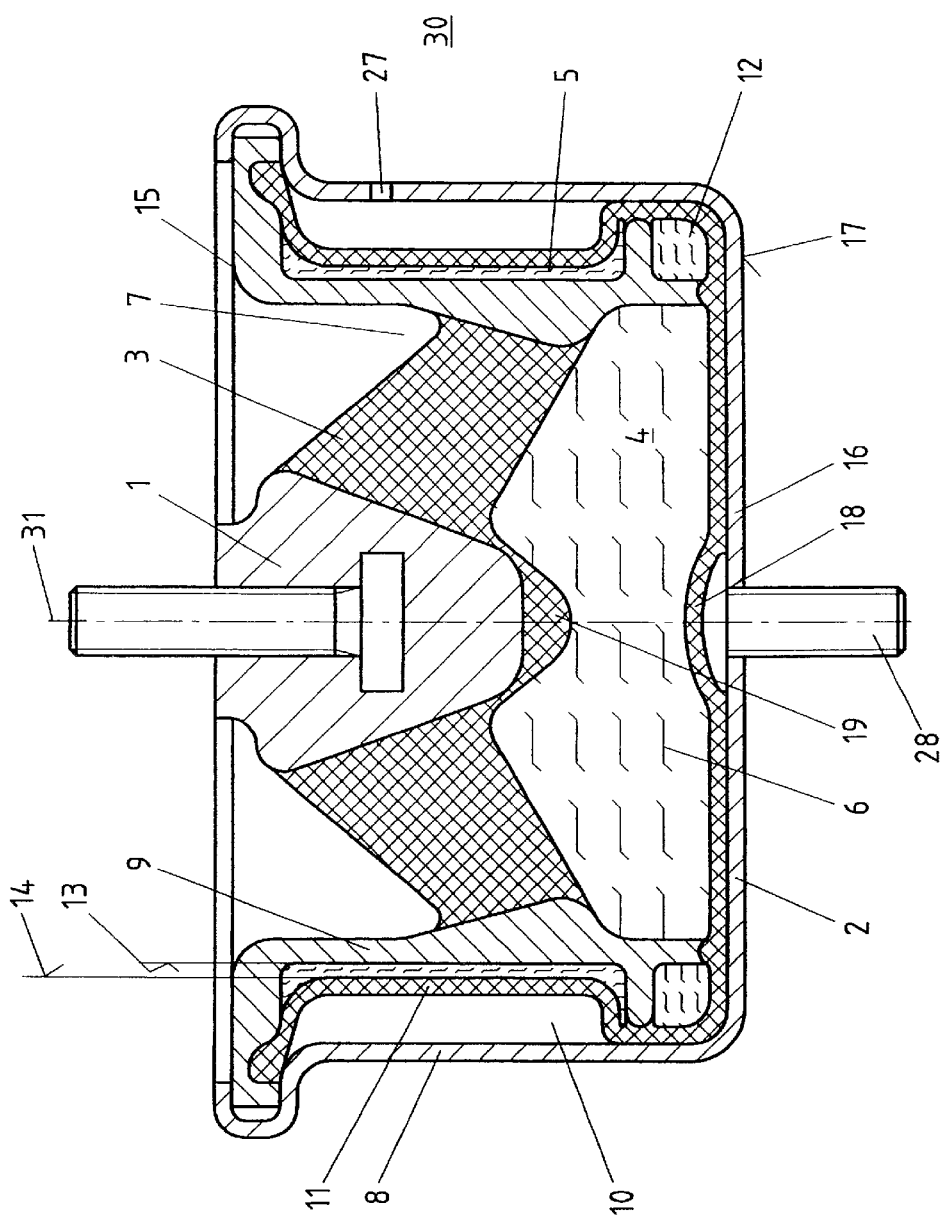
FIG. 3 shows a longitudinal section of a second exemplary embodiment.

FIG. 3 displays a longitudinal section of a second exemplary embodiment of the hydraulic bearing. The hydraulic bearing from FIG. 3 essentially differs from the hydraulic bearing from FIG. 1, in that first stop buffer 18, which extends in the direction of supporting bearing 1, is configured integrally and continuously in boundary wall 11, and they are formed from a uniform material. Together with inner ring 9, boundary wall 11 does not only delimit compensating chamber 5, but also damping channel 12, boundary wall 11 covering entire base 16 of outer ring 8 with elastomeric material. Mounting element 28, which is schematically formed by an oval-head screw in this exemplary embodiment, is covered as well. Covering the head of mounting element 28 with elastomeric material produces first stop buffer 18, which can be brought into contact with second stop buffer 19.

Figure 4:
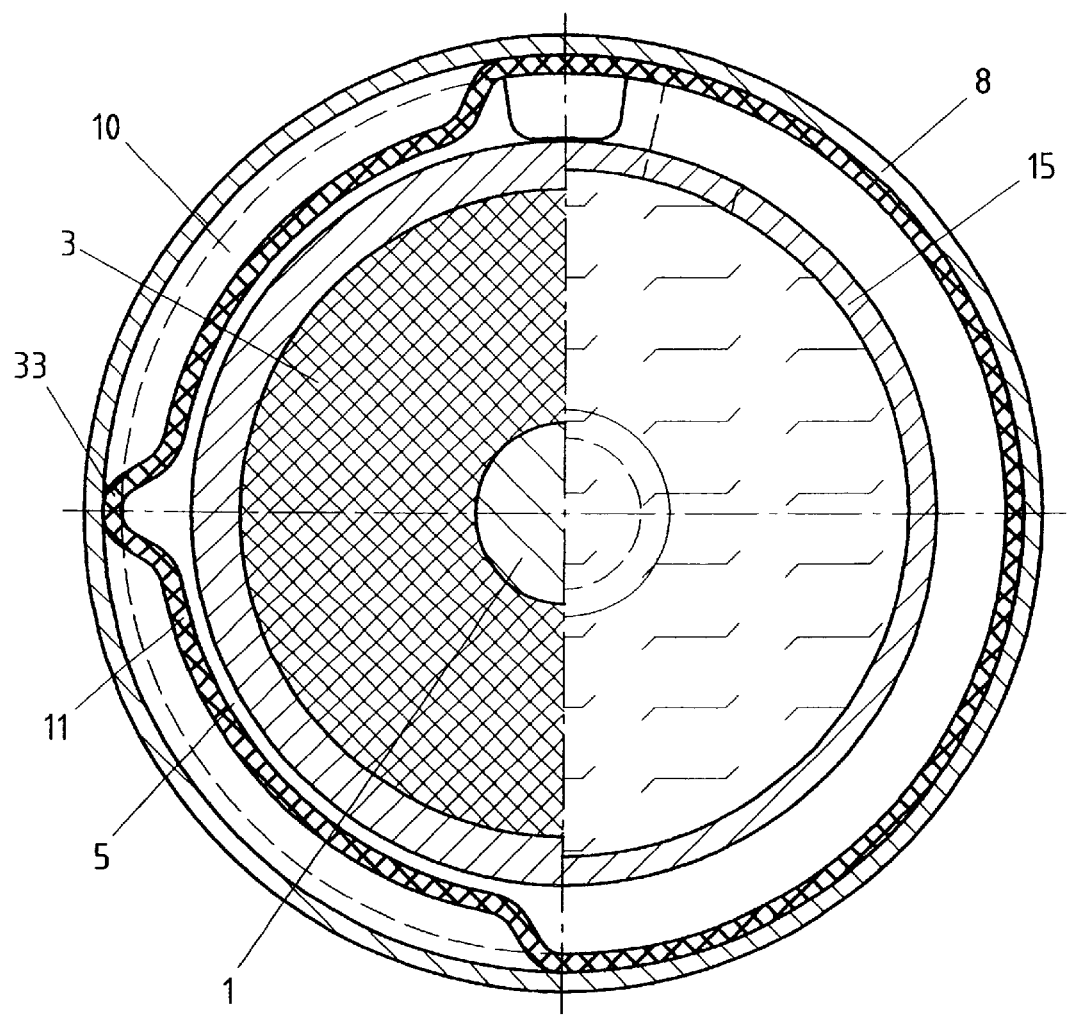
FIG. 4 shows a cross-section of the exemplary embodiment from FIG. 3.

In FIG. 4, a cross-section of the second exemplary embodiment from FIG. 3 is shown.

Figure 5:
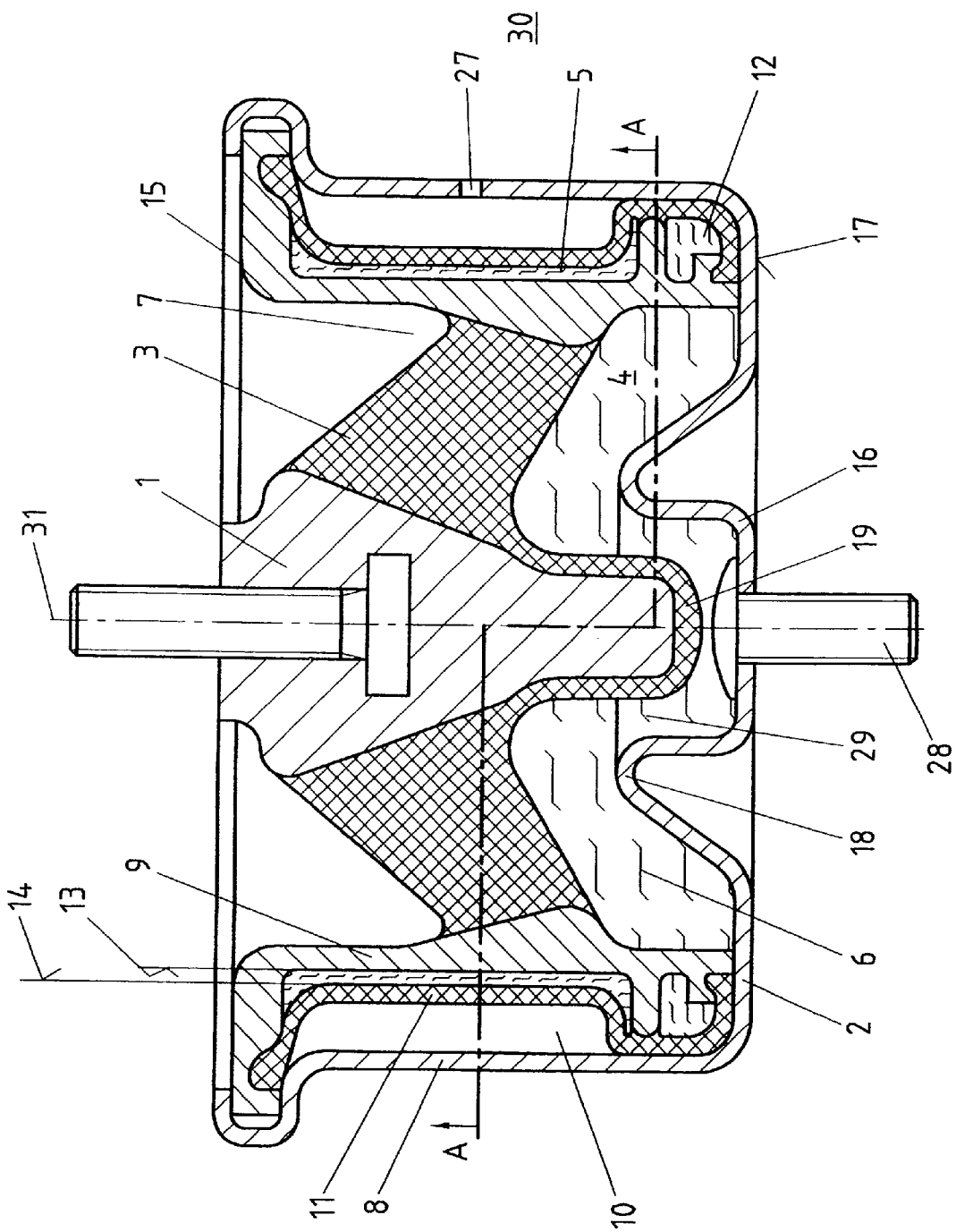
FIG. 5 shows a longitudinal section of a third exemplary embodiment.

FIG. 5 displays a third exemplary embodiment, which essentially differs from the previous exemplary embodiments by the shape of its base 16. Base 16 has an annular, first stop buffer 18, which is formed from sheet metal and juts in the direction of supporting bearing 1. First stop buffer 18 delimits a pot-shaped interior space 29, into which conical, second stop buffer 19 extends. Upon plunging into interior space 29, second stop buffer 19 displaces the liquid components therein, so that it is already hydraulically cushioned prior to impact. This design provides buffering in the radial direction as well as axial. There is also an advantageous effect at high frequency caused by fluid flow around the second buffer.

Figure 6:
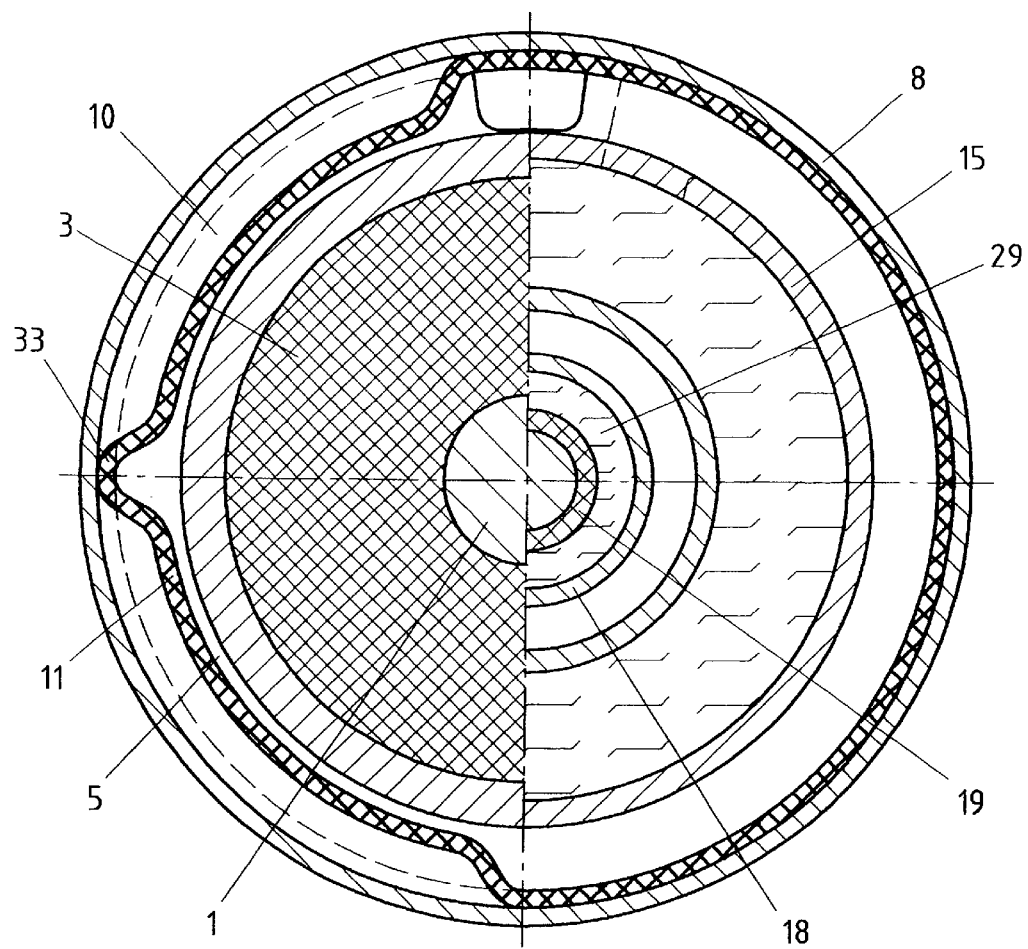
FIG. 6 shows a cross-section of the exemplary embodiment from FIG. 5.

FIG. 6 shows a cross-section of the third exemplary embodiment from FIG. 5.

Figure 7:
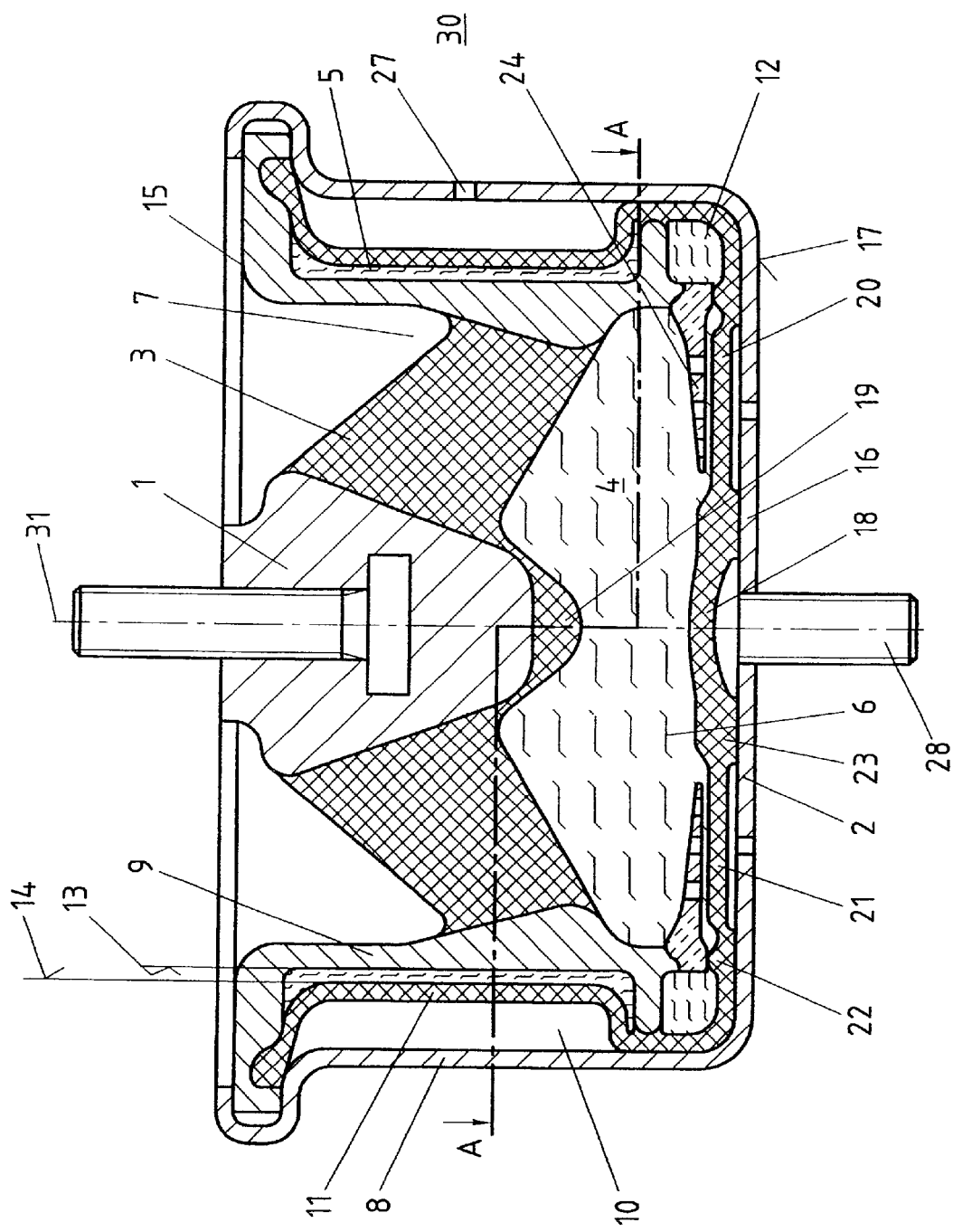
FIG. 7 shows a longitudinal section of a fourth exemplary embodiment.

FIG. 7 displays a fourth exemplary embodiment of the hydraulic bearing according to the present invention. This hydraulic bearing essentially differs from the ones previously described, in that in addition to damping low-frequency, high-amplitude vibrations, high-frequency, low-amplitude vibrations can also be isolated.

The nozzle cage is essentially formed by base 16 of outer ring 8, which has a plurality of openings 27 in the direction of surroundings 30. Positioned inside working chamber 4 is a latticed stop 24, which is designed as a separately manufactured insert, and is made of a metallic material in this exemplary embodiment. Annular subsection 21 of diaphragm 20 is arranged adjacently to both base 16 and stop 24 with matching axial clearances, and can move in phase with the introduced vibrations, between base 16 and stop 24, in order to insulate against high-frequency, low-amplitude vibrations. Annular subsection 21 is radially bound on the outside and inside by spacer 22 and spacer 23, spacers 22 and 23 continually contacting base 16.

As shown in the second exemplary embodiment in FIG. 3, boundary wall 11 is formed integrally and continuously in each other by the elastomeric material, which delimits damping channel 12, forms diaphragm 20, including annular, vibratory subsection 21, and covers mounting element 28, thereby forming first stop buffer 18, which can be brought into contact with second stop buffer 19 in order to limit extreme spring deflection movements.

In spite of excellent working properties in regard to damping low-frequency, high-amplitude vibrations and insulating against high-frequency, low-amplitude vibrations, the hydraulic bearing shown in FIG. 7 has a very compact design in the axial direction, which can essentially be attributed to compensating chamber 5 radially enclosing working chamber 4, elastic spring element 3, and supporting bearing 1, on the outside.

Figure 8:
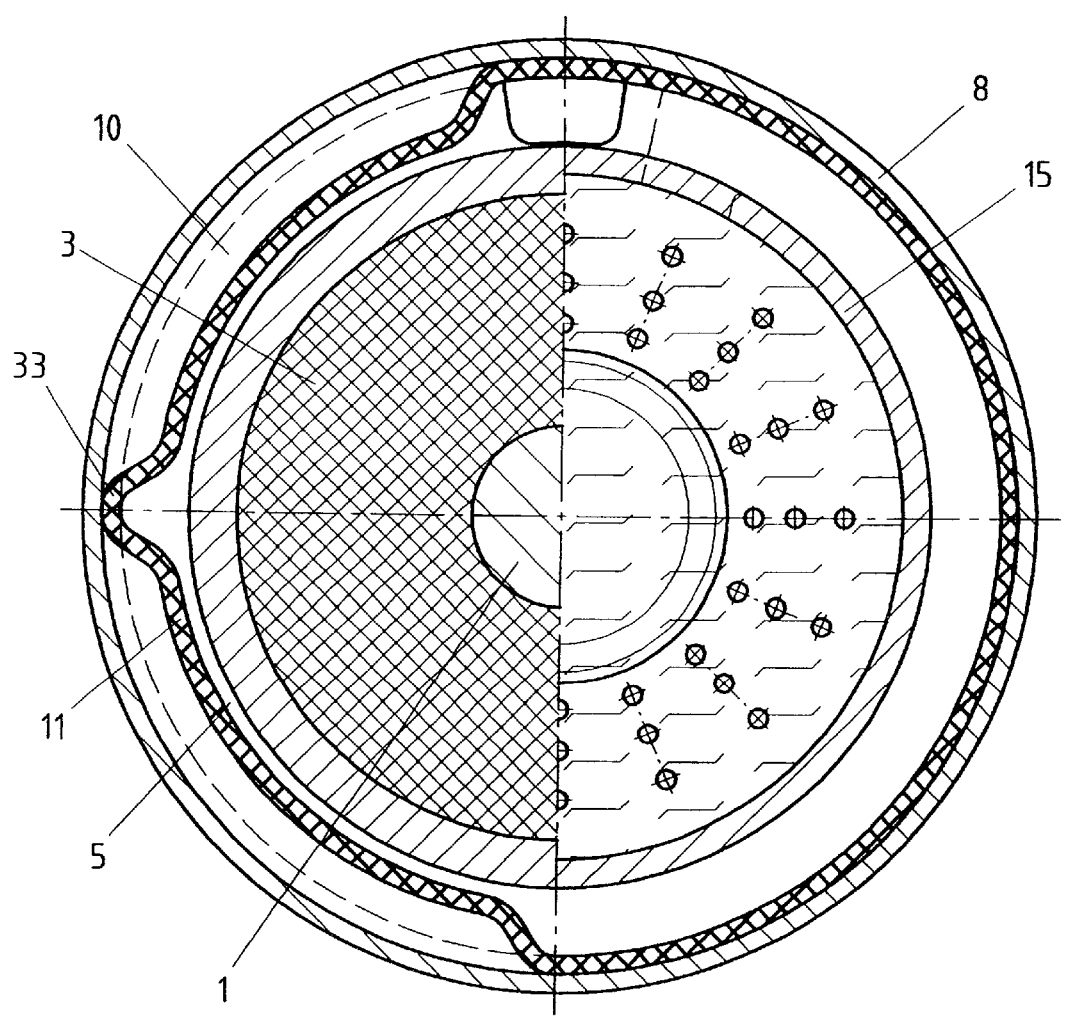
FIG. 8 shows a cross-section of the exemplary embodiment from FIG. 7.

FIG. 8 gives a cross-sectional representation of the hydraulic bearing from FIG. 7.

Figure 9:
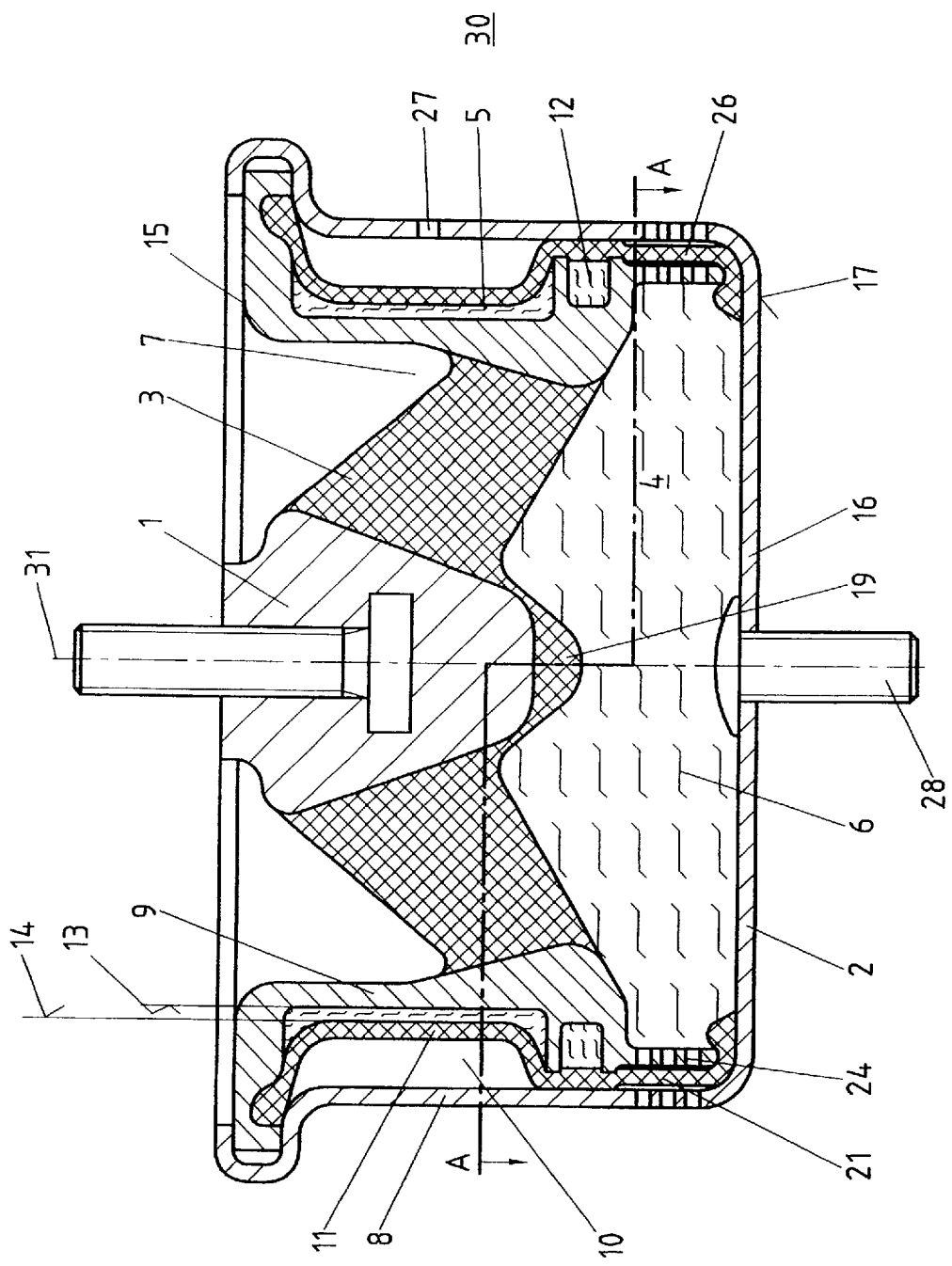
FIG. 9 shows a longitudinal section of a fifth exemplary embodiment.

In FIG. 9, a fifth exemplary embodiment of a hydraulic bearing according to the present invention is shown, which, in view of its working properties and functions, does not differ fundamentally from the hydraulic bearings of FIGS. 7 and 8.

Instead of the separate insert that forms latticed stop 24 for subsection 21 of FIG. 8, latticed stop 24 in this exemplary embodiment extends downwards in the axial direction, concentrically to axis 31, and clamps spacer 23 against base 16 in a liquid-tight manner. However, base 16 is not coated by an elastomeric material on the side opposite to second stop buffer 19, so that second stop buffer 19 contacts mounting element 28 in order to limit extreme spring-deflection movements.

Figure 10:
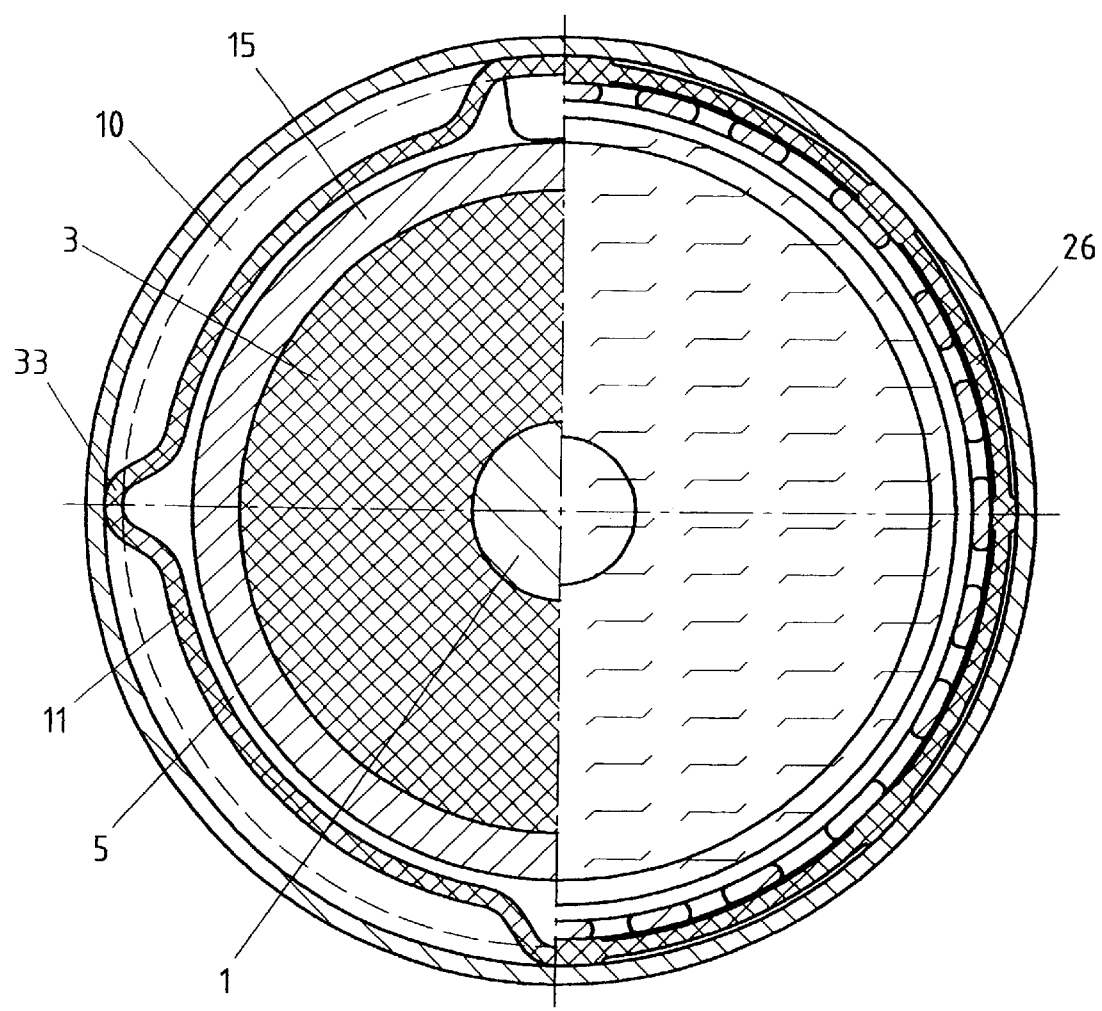
FIG. 10 shows a cross-section of the exemplary embodiment from FIG. 9.

FIG. 10 displays a cross-section of the exemplary embodiment from FIG. 9.

Figure 11:
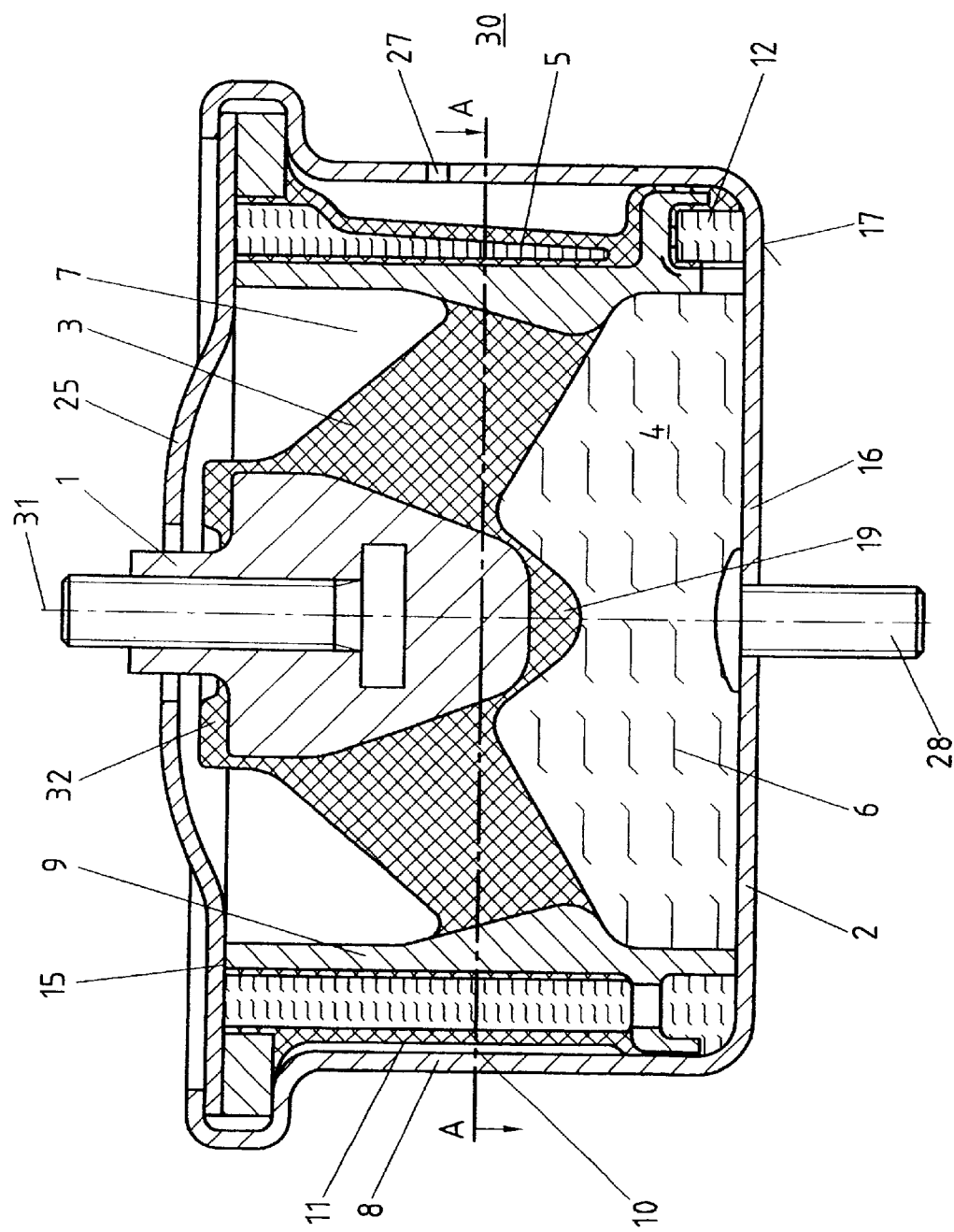
FIG. 11 shows a longitudinal section of a sixth exemplary embodiment.

FIG. 11 shows a sixth exemplary embodiment of a hydraulic bearing according to the present invention, which has a rebound-travel stop 25 that annular stop 32 can contact to limit extreme rebounding movements. This effectively prevents tensile or shear stresses inside elastic spring element 3, which reduce service life.

Rebound-travel stop 25 displayed in FIG. 11 can also be combined with any of the previously described hydraulic bearings.

In addition, the hydraulic bearing from FIG. 11 distinguishes itself by the shape of compensating chamber 5, whose volume decreases axially in the direction of base 16.

Buffer stops for axial and radial deflection movements are formed by this form of the hydraulic bearing. In addition, an advantageous effect in the high frequency range is achieved by the inner surface of the first buffer stop 29. In this frequency range, the result is a to-and-fro displacement of the liquid components into and out of this area.

Figure 12:
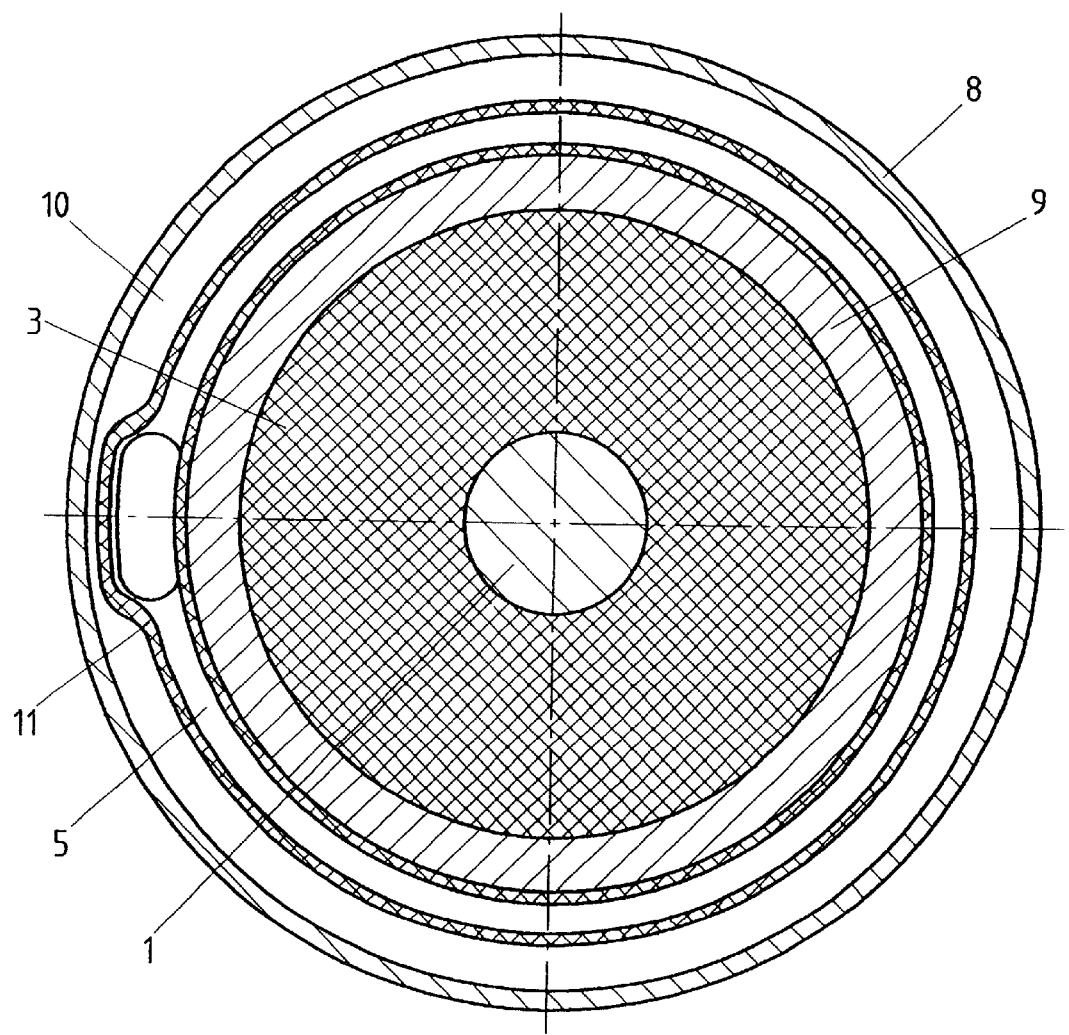
FIG. 12 shows a cross-section of the exemplary embodiment from FIG. 11.

The main advantage of the hydraulic bearing in FIGS. 11 and 12 is that boundary wall 11 forms an integral part of elastic spring element 3, and rebound-travel stop 25 is designed as closing element and liquid-tight seal of compensating chamber 5.

In each of the exemplary embodiments shown here, viewed as a cross-section of the hydraulic bearing, rib 33 has been provided, forming part of boundary wall 11. Rib 33 causes a reduction in the mechanical stresses on boundary wall 11, which is of particular advantage with regard to consistently good working properties during a long service life.

What is claimed is:

1. A hydraulic bearing, comprising: a supporting bearing (1) and a bearing member (2), which are supported against each other by an elastic spring element (3) made of rubber elastic material, and delimit a working chamber (4) and a compensating chamber (5); the working chamber (4) and the compensating chamber (5) each being filled with damping fluid (6) and being in fluid communication with each other; the bearing member (2) essentially having a pot-shaped design; the supporting bearing (1) and the elastic spring element (3) essentially being disposed in the interior space (7) defined by the pot-shaped bearing member (2); the peripheral side of bearing member (2) is having a two-shell design and an outer ring (8), which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (6) and inner ring (9) in a liquid-tight manner.

2. The hydraulic bearing according to claim 1, wherein the elastic spring element (3) is formed in the shape of a truncated cone.

3. The hydraulic bearing according to claim 1, wherein the boundary wall (11) is formed in the shape of a rolling diaphragm.

4. The hydraulic bearing according to claim 1, wherein the elastic spring element (3) is vulcanized between the supporting bearing (1) and the inner ring (9).

5. The hydraulic bearing according to claim 1, wherein the inner ring (9) and the boundary wall (11) delimit a damping channel (12), which connects the working chamber (4) and the compensating chamber (5) so as to be in fluid communication with each other.

6. A hydraulic bearing comprising: a supporting bearing (1) and a bearing member (2), which are supported against each other by an elastic spring element (3) made of rubber elastic material, and delimit a working chamber (4) and a compensating chamber (5); the working chamber (4) and the compensating chamber (5) each being filled with damping fluid (6) and being in fluid communication with each other; the bearing member (2) essentially having a pot-shaped design; the supporting bearing (1) and the elastic spring element (3) essentially being disposed in the interior space (7) defined by the pot-shaped bearing member (2); the peripheral side of bearing member (2) is having a two-shell design and an outer ring (8), which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (6) and inner ring (9) in a liquid-tight manner, wherein the compensating chamber (5) is delimited by the outer surface (13) of the inner ring (9) and the inner surface (14) of the boundary wall (1).

7. The hydraulic bearing according to claim 1, wherein the outer ring (8) is formed by a deep-drawable piece of sheet metal, which embraces and form-locks the end face (15) of the inner ring (9) facing the supporting bearing (1).

8. The hydraulic bearing according to claim 1, wherein the outer ring (8) has a base (16), which forms the hydraulic-bearing end face (17) on the side of the bearing member.

9. A hydraulic bearing comprising: a supporting bearing (1) and a bearing member (2), which are supported against each other by and elastic spring element (3) made of rubber elastic material, and delimit a working chamber (4) and a compensating chamber (5); the working chamber (4) and the compensating chamber (5) each being filled with damping fluid (6) and being in fluid communication with each other; the bearing member (2) essentially having a pot-shaped design; the supporting bearing (1) and the elastic spring element (3) essentially being disposed in the interior space (7) defined by the pot-shaped bearing member (2); the peripheral side of bearing member (2) is having a two-shell design and an outer ring (8), which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (6) and inner ring (9) in a liquid-tight manner, wherein the outer ring (8) has a base (16), which forms the hydraulic-bearing end face (17) on the side of the bearing member, and wherein the base (16) has at least one first stop buffer (18) protruding in the direction of the supporting bearing (1).

10. The hydraulic bearing according to claim 9, wherein the first stop buffer (18) is made of an elastomeric material.

11. The hydraulic bearing according to claim 1, wherein the first stop buffer (18) and the boundary wall (11) are configured integrally and continuously with one another, and formed from a uniform material.

12. A hydraulic bearing comprising: a supporting bearing (1) and a bearing member (2), which are supported against each other by an elastic spring element (3) made of rubber elastic material, and delimit a working chamber (4) and a compensating chamber (5); the working chamber (4) and the compensating chamber (5) each being filled with damping fluid (6) and being in fluid communication with each other; the bearing member (2) essentially having a pot-shaped design; the supporting bearing (1) and the elastic spring element (3) essentially being disposed in the interior space (7) defined by the pot-shaped bearing member (2); the peripheral side of bearing member (2) is having a two-shell design and an outer ring (8), which encloses an inner ring (9) with a radial clearance; the compensating chamber (5) being disposed in the gap formed by the clearance, and being delimited by a boundary wall (11), which extends in the axial direction, can expand in a radial direction, and essentially accommodates an increase in volume pressurelessly; and the boundary wall (11) being positioned between the outer ring (6) and inner ring (9) in a liquid-tight manner, wherein the supporting bearing (1) has at least one second stop buffer (19) protruding axially in the direction of the working chamber (4).

13. The hydraulic bearing according to claim 9, wherein the first (18) and the second stop buffers(19) can contact each other to limit extreme excursion movements in the axial direction.

14. The hydraulic bearing according to claim 1, wherein a diaphragm (20), which can vibrate in the axial direction, is disposed inside the working chamber (4).

15. The hydraulic bearing according to claim 14, wherein the diaphragm (20) is formed from the same material as the boundary wall (11) and configured integrally and continuously in it, and at least one annular subsection (21) of the diaphragm is positioned adjacently to the base (16), with an axial clearance.

16. The hydraulic bearing according to claim 15, wherein the annular subsection (21) is supported on its outer- and inner-circumferential sides by at least one respective spacer (22, 23), at the base (16).

17. The hydraulic bearing according to claim 15, wherein the side of the subsection (21) facing the working chamber (4) is covered by a latticed stop (24), which is positioned adjacently to it with an axial clearance.

18. The hydraulic bearing according to claim 17, wherein the stop (24) is designed as a separately manufactured insert.

19. The hydraulic bearing according to claim 14, wherein the axial clearance between the subsection (21) and the base (16), and the axial clearance between the subsection (21) and the stop (24), are essentially identical.

20. The hydraulic bearing according to claim 1, wherein a radially vibratory diaphragm (26) is disposed inside the working chamber (4).

21. The hydraulic bearing according to claim 20, wherein the diaphragm (26) is formed from the same material as the boundary wall (11), is configured integrally and continuously in it, and extends in the axial direction.

22. The hydraulic bearing according to claim 20, wherein the side of the diaphragm (26) facing the working chamber (4) is covered by a latticed stop (24).

23. The hydraulic bearing according to claim 22, wherein the stop (24) forms a one-piece component of the inner ring (9).

24. The hydraulic bearing according to claim 1, wherein the compensating chamber (4), in at least one subsection of its peripheral-side extension as viewed in longitudinal cross-section, exhibits a cross-section that becomes smaller in the direction of the base (16) of the bearing member (2).

25. The hydraulic bearing according to claim 1, wherein a rebound-travel stop (25) is assigned to the supporting bearing (1) an the side of it axially facing away from the bearing member (2).

26. The hydraulic bearing according to claim 25, wherein the rebound-travel stop (25) is formed in the shape of a ring, extends over the supporting bearing (1), and can be brought into contact with the supporting bearing in the case of undesirably large rebounding movements.

* * * * *